US011175894B2

(12) United States Patent
Bragdon et al.

(10) Patent No.: US 11,175,894 B2
(45) Date of Patent: Nov. 16, 2021

(54) FLOW ANALYSIS IN AN INTEGRATION PLATFORM

(71) Applicant: salesforce.com, inc., San Francisco, CA (US)

(72) Inventors: Andrew Craig Bragdon, Brentwood, CA (US); Ignacio Agustin Manzano, Buenos Aires (AR); Agustin Lopez Gabeiras, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 16 days.

(21) Appl. No.: 16/264,465

(22) Filed: Jan. 31, 2019

(65) Prior Publication Data
US 2020/0249914 A1 Aug. 6, 2020

(51) Int. Cl.
*G06F 8/20* (2018.01)
*G06F 8/34* (2018.01)
*G06F 8/35* (2018.01)

(52) U.S. Cl.
CPC ............... *G06F 8/20* (2013.01); *G06F 8/34* (2013.01); *G06F 8/35* (2013.01)

(58) Field of Classification Search
None
See application file for complete search history.

(56) References Cited

U.S. PATENT DOCUMENTS

| | | | |
|---|---|---|---|
| 2007/0168060 A1* | 7/2007 | Nixon | G06F 9/451 700/83 |
| 2007/0168999 A1* | 7/2007 | Haber | G06F 11/3612 717/130 |
| 2008/0127102 A1* | 5/2008 | Anderson | G06F 11/3471 717/125 |
| 2009/0006062 A1* | 1/2009 | Sedukhin | G06F 8/64 703/13 |
| 2009/0055838 A1* | 2/2009 | Sedukhin | G06F 11/3612 719/318 |
| 2009/0177929 A1* | 7/2009 | Sijelmassi | G06F 11/0709 714/47.2 |
| 2012/0158925 A1* | 6/2012 | Shen | G06F 9/5011 709/221 |
| 2012/0222002 A1* | 8/2012 | Harrison | G06F 11/328 717/113 |
| 2014/0280142 A1* | 9/2014 | Wasson | G06F 16/2465 707/737 |
| 2020/0125336 A1* | 4/2020 | Mills | G06F 8/36 |

\* cited by examiner

*Primary Examiner* — Daxin Wu
(74) *Attorney, Agent, or Firm* — Sterne, Kessler, Goldstein & Fox P.L.L.C.

(57) ABSTRACT

Disclosed herein are system, method, and device embodiments for implementing flow analysis in an integration platform system. An integration platform may provide a declaratively-configurable asset within an integration-application design tool, configure the declaratively-configurable asset based on declarative configuration information via the integration-application design tool, and package the declaratively-configurable asset into an integration application. Further, the integration platform may calculate a statistic associated with the declaratively-configurable asset based on the declarative configuration information during an execution of the integration application, and cause display of a graphic representation of the declaratively-configurable asset and the statistic in a monitoring tool.

20 Claims, 8 Drawing Sheets

FLOW ANALYSIS IN AN INTEGRATION PLATFORM

BACKGROUND

Integration platforms allow organizations to design, implement, and deploy software systems that integrate and harness heterogeneous resources (e.g., applications, services, and data sources) from across an organization's technical landscape. An integration platform may include functional components to design integration applications, retrieve and transform data, interact with various application programming interfaces (APIs), deploy integration applications to users, and otherwise maintain such applications. Often, operation of an integration application requires significant data flow between complex and disparate systems not originally designed for interoperability. As such, it can be very difficult to implement comprehensive mechanisms for data flow analysis, thereby presenting many challenges to developers endeavoring to improve the efficiency and usability of the integration application via data-driven design.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1A:
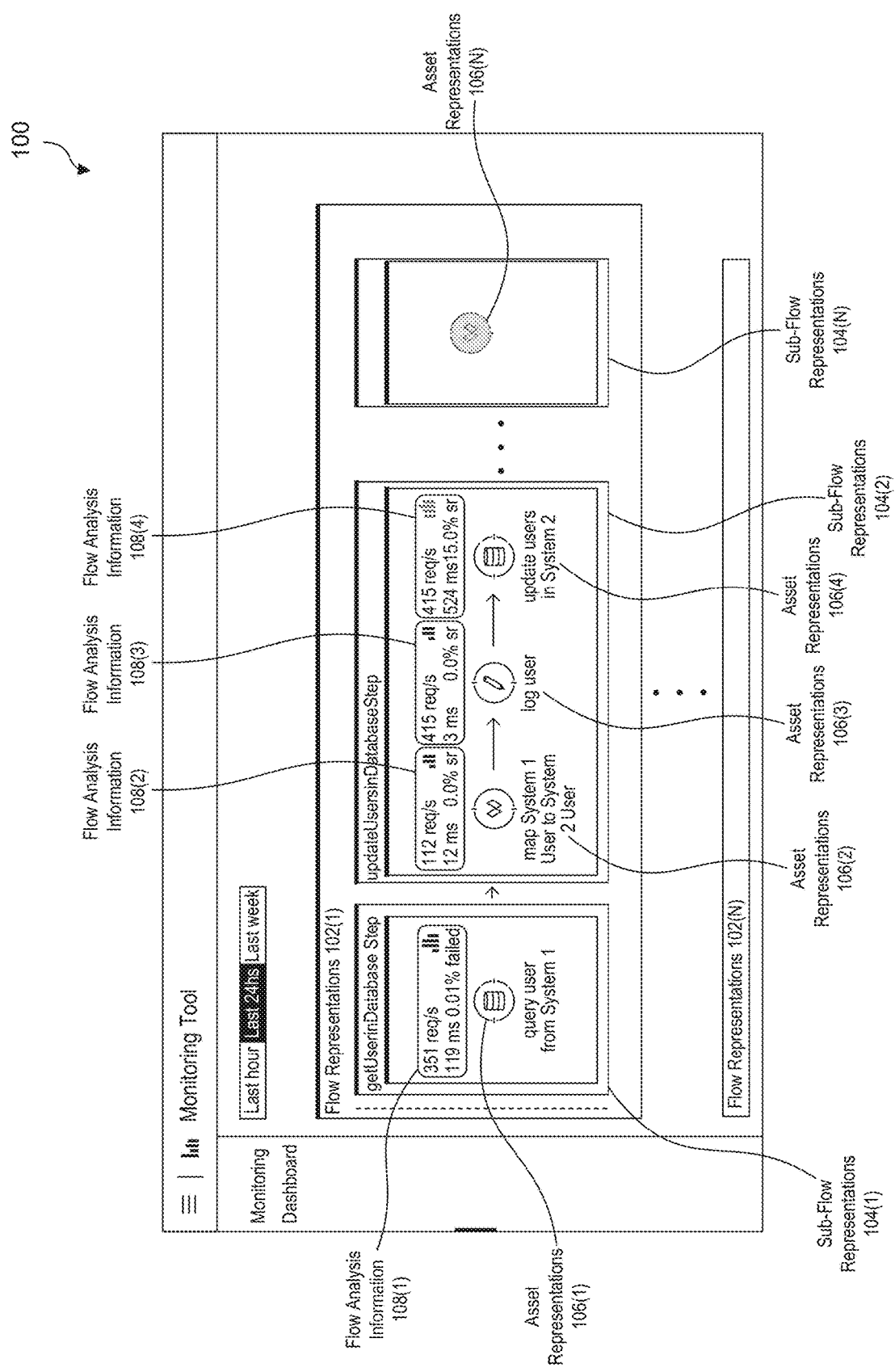
FIGS. 1A-1C illustrate an example graphical user interface of a monitoring application for implementing flow analysis in an integration platform, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for displaying gathered metrics about programmed instructions in an integration platform.

Figure 1B:
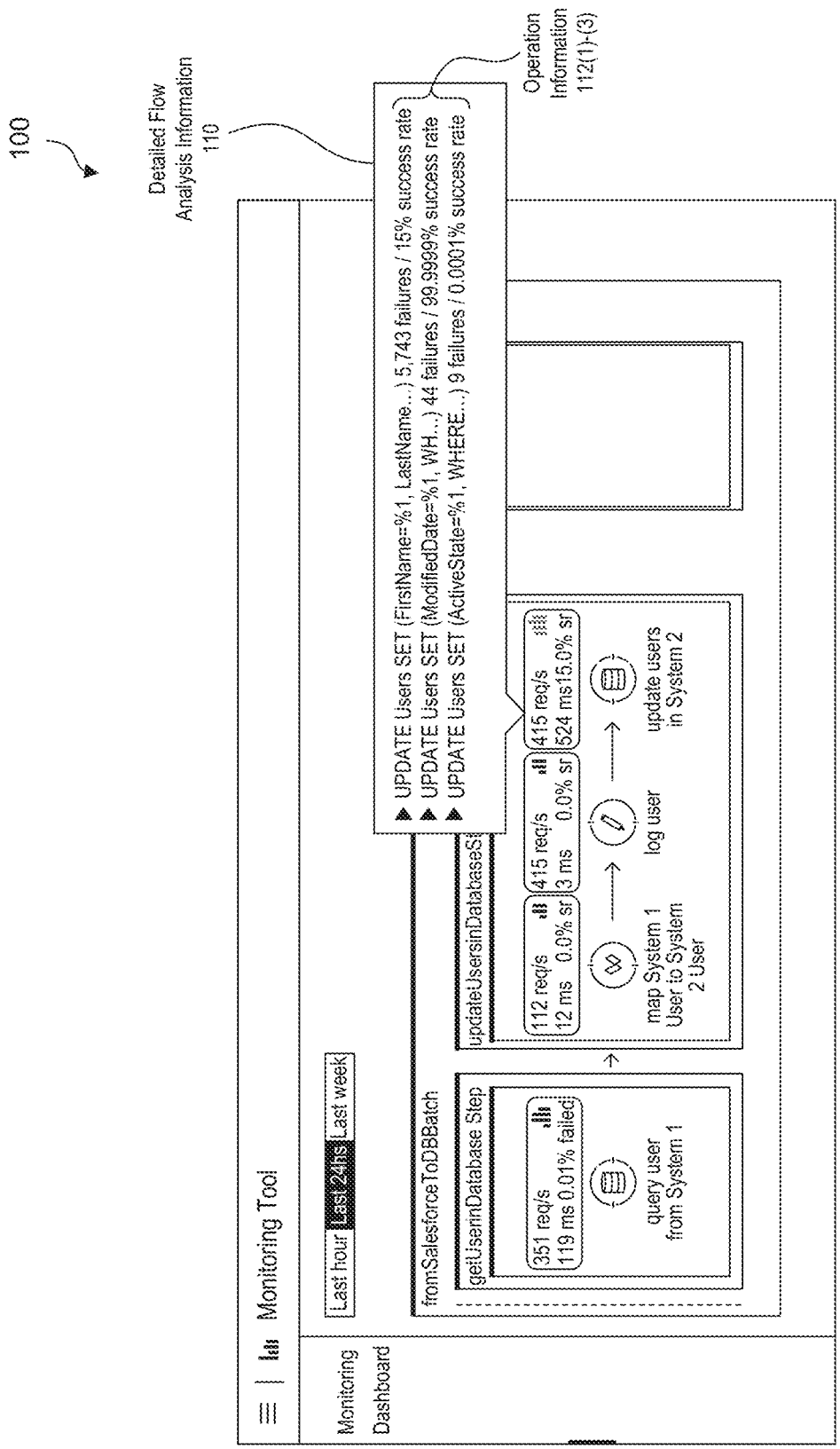
Figure 1C:
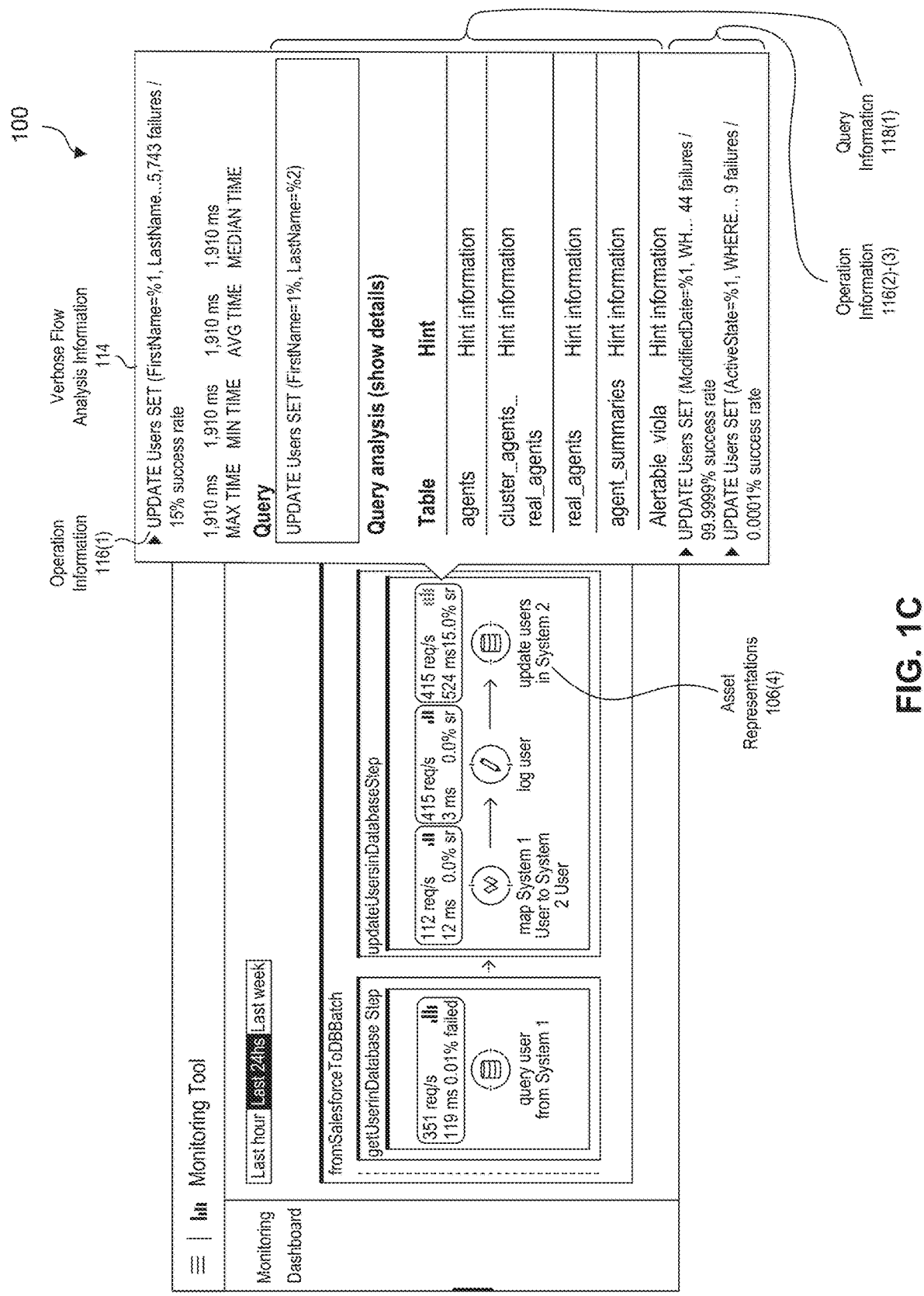

FIGS. 1A-1C illustrate an example graphical user interface (GUI) 100 of a monitoring application for implementing flow analysis in an integration platform, according to embodiments of the present disclosure. Referring to FIGS. 1A-1C, the GUI 100 provides application information corresponding to activity of an integration application developed on the integration platform. In some embodiments, application information may include performance metrics indicating the amount of requests received over a predetermined period of time, the amount of responses sent over a predetermined period of time, processing rates of individual requests, processing rates of particular types of requests, response times to individual requests, response times to particular types of requests, a minimum processing time of a type of request, a maximum processing time of a type of request, a median processing time of a type of request, resource usage in terms of CPU and memory, success and/or failure rates of requests, operations, or execution paths, etc.

As used herein, and in some embodiments, an "integration platform" may refer to a software platform that integrates a plurality of software applications and services. In some examples, the integration platform may incorporate at least one of an enterprise service bus (ESB) architecture, microservice architecture, or service oriented architecture (SOA). As used herein, and in some embodiments, an "integration application" may refer to an application developed using an integration platform. For instance, the integration application may include one or more pre-built components of the integration platform, be deployed within a runtime environment of the integration platform, and/or execute within an integrated platform as a service (iPaaS).

As used herein, and in some embodiments, a "monitoring application" may refer to an application or service for managing and/or monitoring execution of an integration application. As described herein, a monitoring application may collect application information during execution of an integration application associated with the monitoring application. Further, the monitoring application may present the application information in near-real time or real-time via a GUI (e.g., the GUI 100).

Suppose the monitoring application is presenting the GUI 100 with respect to an integration application that provides customer relationship management functionalities. For instance, the integration application may be configured to update a customer name within the integration application. Further, updating the customer name within the integration application may entail retrieving a first user identifier within a first system, determining a second user identifier within a second system based on the first identifier, logging the update to the customer name in a log file of the integration application, and updating the customer name in the second system. As such, the monitoring application may be configured to collect and display application information pertaining to the integration application executing one or more processes to update customer names during execution.

In some embodiments, the integration application may include process flows. A process flow may include one or more assets or process sub-flows, and define a single repeatable process within the integration application. As used herein, and in some embodiments, "a process flow" may be a construct within which a developer links together several individual assets to handle the receipt, processing, and eventual routing of a message. Further, a developer may connect process flows together to build a complete integration application which the developer can then deploy on-premise, via an application server, or in the cloud. In some embodiments, process flows and process sub-flows may be integration application components for grouping together a sequence of assets and/or operations to help automate integration processes.

For example, an integration application may include a process flow for updating the customer's name across multiple integrated systems (i.e., the first system and the second system) of the integration application. Further, the monitoring application may collect and present flow analysis information indicating the performance metrics of the process flows and process sub-flows of the integration application within the GUI 100. In some embodiments, the flow analysis information may indicate the performance of the integration application as messages propagate thru the one or more process flows of the integration application.

In some embodiments, each asset of a process flow receives an input message, carries out a specific function, and then transfers an output message to the next part of the process flow. As such, the sequence of the assets in a process flow determines the functionality of an integration application. In some embodiments, an integration application may be a single process flow, or a collection of discrete process flows and process sub-flows that interact with each other. For instance, an integration application may implement multiple process flows and process sub-flows to divide an integration application into functional modules and/or for error-handling purposes.

As illustrated in FIG. 1A, the GUI 100 may include flow representations 102(1)-(N). Further, each flow representation 102 may correspond to a process flow within the integration application. In some embodiments, the flow representations 102 may depict the process flows, process sub-flows, and/or assets of an integration application. For example, the flow representation 102(1) may correspond to the process flow for updating a customer name within the integration application. In addition, the flow representation 102(1) may include sub-flow representations 104(1)-(N) corresponding to the process sub-flows of the process flow for updating the a customer's name.

As further illustrated in FIG. 1A, the sub-flow representations 104(1)-(N) may include one or more assets representations 106(1)-(N) corresponding to the assets of the process flow. For instance, the sub-flow representation 104(1) may include the asset representation 106(1) corresponding to the asset for retrieving a first user identifier within a first system, and the sub-flow representation 104(2) may include the assets representations 106(2)-(4). The asset corresponding to the asset representation 106(2) may determine a second user identifier within a second system based on the first identifier, the asset corresponding to the asset representation 106(3) may log the update to the customer name in a log file of the integration application, and the asset corresponding to the asset representation 106(4) may update the customer name in the second system.

Further, the GUI 100 may present flow analysis information 108(1)-(N) for the assets associated with the assets representations 106(1)-(N) of the flow representations 102(1)-(N). For example, as illustrated in FIG. 1A, first flow analysis information 108(1) may be presented with the first asset representation 106(1) to indicate performance metrics corresponding to the step of retrieving a first user identifier within a first system, second flow information may be presented with the second asset representation 106(2) to indicate performance metrics corresponding to the step of determining a second user identifier within a second system based on the first identifier, Nth flow information may be presented with the Nth asset representation 106(N) to indicate performance metrics corresponding to the function of the Nth asset representation 106(N), and so forth.

As described in detail herein, the individual assets may provide the monitoring application with analytics information corresponding to their individual functions. In some embodiments, the assets may be pre-configured to provide the analytics information to the monitoring application. Upon receipt of the analytics information, the monitoring application may generate the flow analysis information 108 based upon the analytics information, and present the flow analysis information 108 within the GUI 100.

As illustrated in FIG. 1A, the flow analysis information 108 may include the amount of requests the asset corresponding to the asset representation 106 receives over a predetermined period of time (e.g., the amount of request received per second), the average processing time of a request, and a success or failure rate of the operations performed by the asset in response to request. For example, flow analysis information 108(1) may display the amount of requests to retrieve a user identifier for a customer within the first system received per second by the asset corresponding to the asset representation 106(1), the average amount of time it takes the asset corresponding to the asset representation 106(1) to retrieve the user identifier and provide the user identifier to the asset representation 106(2), and the success rate of the asset corresponding to the asset representation 106(1) in fulfilling requests to retrieve a user identifier for a customer within the first system.

Additionally, the flow analysis information 108 may include one or more graphical effects to communicate to a user the status of a process flow, process sub-flow, and/or asset. Some examples of graphical effects include a graphic scheme, color scheme (e.g., brightness intensity lightness, darkness), or graphic element. For instance, if the success rate is above average, the success rate value may be displayed using a first color (e.g., green) within the flow analysis information 108. If the success rate is average, the success rate value may be displayed using a second color (e.g., yellow) within the flow analysis information 108. If the success rate is below average, the success rate value may be displayed using a third color (e.g., red) within the flow analysis information 108.

Further, the monitoring application may operate in a real-time or near real-time mode. As such, the monitoring application may continuously monitor the analytics received from the integration application and update the flow analysis information 108 to reflect the most recently received analytics. As such, an administrator and/or developer may employ the monitoring application to monitor the function of an integration application. Further, the observed performance metrics may be used to identify performance bottlenecks, performance irregularities, inefficient components, and potential denial of services, and/or diagnose application performance issues.

As illustrated in FIG. 1B, the GUI 100 may display detailed flow analysis information 110. For example, the GUI 100 may include displayed detailed flow analysis information 110 corresponding to the flow analysis information 108(4) and the asset representation 106(4). In addition, the detailed flow analysis information 110 may include performance metrics particular to the operations performed by the asset corresponding to the asset representation 106(4), thus providing a user of the monitoring application analytical insight about the performance of individual operations performed by the asset representation 106(4).

For instance, the detailed flow analysis information 110 may include the operation information 112 corresponding to the operations performed by the asset corresponding to the asset representation 106(4) as a part of the process sub-flow 104(2). Further, the operation information 112 may include the number of failures for each of the operations and a success rate or failure rate of each of the operations. As an example, the operation information 112(1) may indicate that the asset corresponding to the asset representation 106(4) executes a SQL operation that has failed 5,743 times and has a success rate of 15%.

In some embodiments, the GUI 100 may display the detailed flow analysis information 110 in response to selection of the asset representation 106(4) or the flow analysis information 108(4) by the user of the monitoring application. For example, the user of the monitoring application may perform a mouse over or click on the asset representation 106(4) or the flow analysis information 108(4). Additionally, the detailed flow analysis information 110 may include one or more graphical effects to communicate to a user the status of a process flow, process sub-flow, and/or asset. Some examples of graphical effects include a graphic scheme, color scheme (e.g., brightness intensity lightness, darkness), or graphic element. For instance, if the success rate of an operation is above average, the success rate value may be displayed using a first color (e.g., green) within the detailed flow analysis information 110. If the success rate of an operation is average, the success rate value may be displayed using a second color (e.g., yellow) within the detailed flow analysis information 110. If the success rate of an operation is below average, the success rate value may be displayed using a third color (e.g., red) within the detailed flow analysis information 110.

As illustrated in FIG. 1C, the GUI 100 may display verbose flow analysis information 114. For example, the GUI 100 may display verbose flow analysis information 114 corresponding to the flow analysis information 108(4) and the asset corresponding to the asset representation 106(4). In addition, the verbose flow analysis information 114 may include performance metrics particular to the operations performed by the asset corresponding to the asset representation 106(4), thus providing an administrator or developer analytical insight about the performance of individual operations performed by the asset representation 106(4).

For instance, the verbose flow analysis information 114 may include the operation information 116 associated with the operations performed by the asset corresponding to the asset representation 106(4) as a part of the sub flow representation 104(2). For instance, the operation information 116 may include the number of failures for each of the operations and a success rate or failure rate of each of the operations. As an example, the operation information 116(1) may indicate that the asset corresponding to the asset representation 106(4) executes a SQL operation that has failed 5,743 times and has a success rate of 15%. Further, as illustrated in FIG. 1C, the operation information 116 may display temporal information pertaining to an operation. For example, the operation information 116(1) may indicate the maximum processing time of a database operation performed by the asset corresponding to the asset representation 106(4), the minimum processing time of a database operation performed by the asset corresponding to the asset representation 106 (4), the average processing time of a database operation performed by the asset corresponding to the asset representation 106(4), and the median processing time of a database operation performed by the asset corresponding to the asset representation 106(4).

In addition, the GUI 100 may further display query information 118 corresponding to the operation information 116. For example, if the asset corresponding to the asset representation 106(4) includes database or other data storage functionality, the operation information 116(1) may include query information 118(1) that displays a query associated with an operation corresponding to the operation information 116(1), and hint information corresponding to one or more data structures (e.g., database tables) associated with the query associated with the operation corresponding to the operation information 116(1). For example, the query information 118 may list the SQL operation performed (e.g., a SQL query run in the operation) by the asset corresponding to the asset representation 106(4) to set the customer name to the updated value. In some embodiments, the operation information 116(1) may be selectable to expand to display the query information 118(1).

In some embodiments, the GUI 100 may display the verbose flow analysis information 114 in response to selection of the asset representation 106(4) or the flow analysis information 108(4) by the user of the monitoring application. For example, the user of the monitoring application may perform a mouse over or click on the asset representation 106(4) or the flow analysis information 108(4). Additionally, the verbose flow analysis information 114 may include one or more graphical effects to communicate to a user the status of a process flow, process sub-flow, and/or asset. Some examples of graphical effects include a graphic scheme, color scheme (e.g., brightness intensity lightness, darkness), or graphic element. For instance, if the success rate of an operation is above average, the success rate value may be displayed using a first color (e.g., green) within the verbose flow analysis information 114. If the success rate of an operation is average, the success rate value may be displayed using a second color (e.g., yellow) within the verbose flow analysis information 114. If the success rate of an operation is below average, the success rate value may be displayed using a third color (e.g., red) within the verbose flow analysis information 114.

FIGS. 2A-2D illustrate an example GUI 200 of an integration-application design tool for declaratively designing an integration application with flow analysis on an integration platform, according to embodiments of the present disclosure. In some embodiments, an integration-application design tool and a monitoring application may be separate features of the same application. In some other embodiments, the integration-application design tool and the monitoring application may be separate applications executing on within the same computing environment or different computing environments.

Figure 2A:
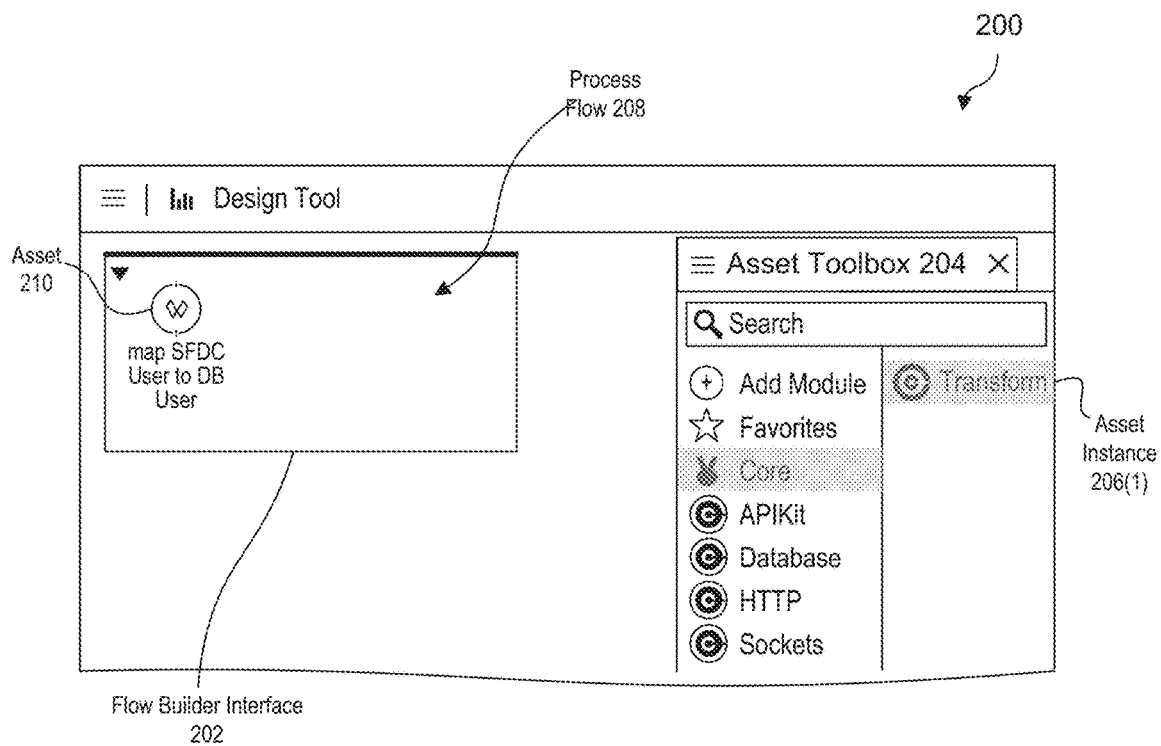
FIGS. 2A-2D illustrate an example graphical user interface of an integration-application design tool for declaratively designing an integration application with flow analysis on an integration platform, according to some embodiments.

As illustrated in FIG. 2A, the GUI 200 may include a flow builder interface 202 and asset toolbox 204 containing a plurality of different asset type instances 206(1)-(N). In some embodiments, a developer may declaratively program a process flow 208 of an integration application within the flow builder interface 202. As used herein, and in some embodiments, "declarative programming" may refer to software development via a point and click, drag and drop interfaces, configuration wizards, and/or declarative language input (eXtensible Markup Language (XML), YAML Ain't Markup Language (YAML), Extensible Application Markup Language (XAML), or any other markup languages) to text input forms. For example, the developer may add an instance of the asset 206(1) from the asset toolbox 204 as the asset 210, and provide a title for the asset 210 within the process flow 208. In some instances, the developer may drag and drop the instance of the asset 206(1) from the asset toolbox 204 to the flow builder interface 202. In some other instances, the developer may use a configuration wizard or menu to add the instance of the asset 206(1) to the process flow 208 being constructed within the flow builder interface 202.

As described in detail herein, the process flow 208 may include message sources and an arrangement of assets (e.g., the asset 210) that act as event-driven message processors. Further, the integration application may begin with processing a message received at an inbound message source of the process flow 208. In response to receipt of the message, the assets of the process flow 208 may be configured to receive a message and generate a response. In some embodiments, a message source may translate a particular communication protocol or method into a standard message format, which is then passed down to the assets of the process flow. Process flows may also use assets to make outbound client requests to other external resources, services, and/or applications.

Some examples of assets include connector assets, scope assets, component assets, transformer assets, filter assets, flow control assets, and error handling assets. Connector assets may be configured to create a direct connection between an integration application and an external resource (e.g., a database, a File Transfer Protocol server, etc.). Component assets may execute whenever a message is received. In some embodiments, a component asset may be a general component asset (e.g., logger component), a script component asset, or a web service component asset. Script component assets may facilitate Software as a Service (SaaS) integration by providing language-specific execution shells for performing custom-coded business logic. Web service component assets may provide a developer with a framework for referencing classes and API's needed by RESTful and SOAP Web services.

Scope assets may provide advanced processing, such as asynchronous invocations, polling, sub flows, etc. Transformer assets may be configured to translate data from a first format to a second format. Filter assets may be configured to determine how messages proceed thru a process flow. Flow control assets may be configured to route messages to other flows or an external service. Error handling assets may be configured to manage software exceptions that arise during processing of a message by a process flow.

Figure 2B:
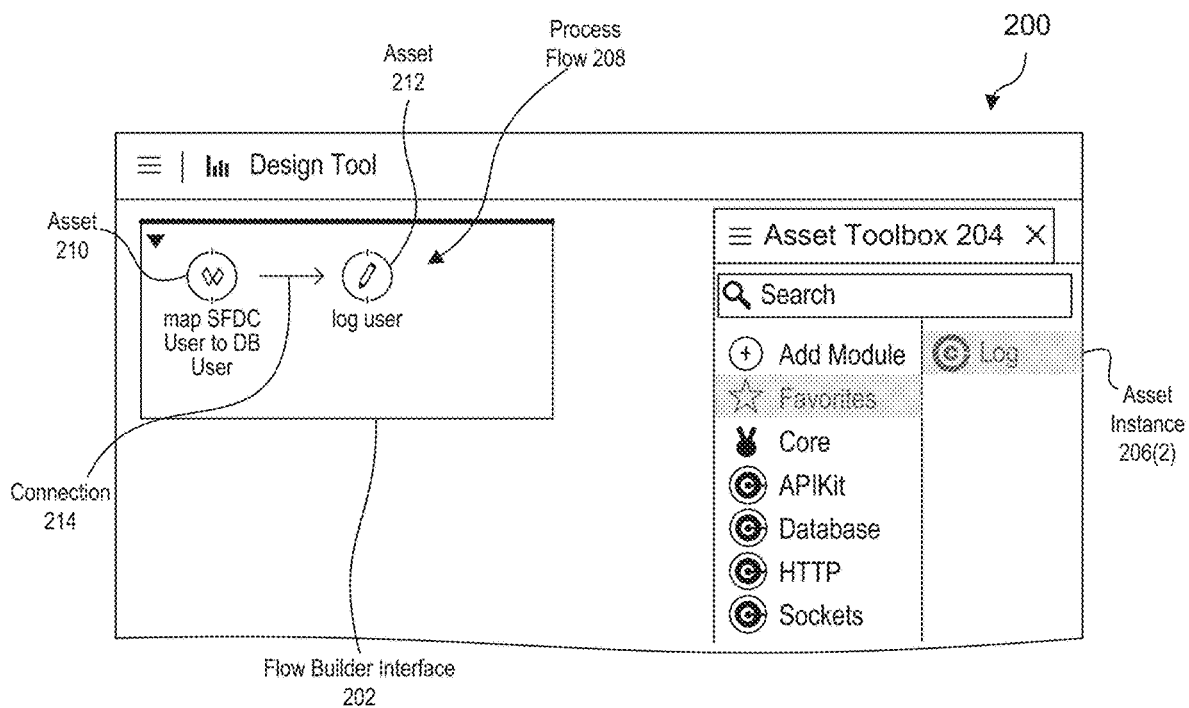

As illustrated in FIG. 2B, the developer may add an instance of the asset 206(2) from the asset toolbox 204 as the asset 212, and provide a title for the asset 212 within the process flow 208. In some instances, the developer may drag and drop the instance of the asset 206(2) from the asset toolbox 204 to the flow builder interface 202. In some other instances, the developer may use a configuration wizard or menu to add the instance of the asset 206(2) to the process flow 208 being constructed within the flow builder interface 202.

Upon receipt of the asset 212, the flow builder interface 202 may be configured to automatically create a connection 214 (i.e., message channel) between the asset 210 and the asset 212. Additionally, or alternatively, the integration-application design tool may provide an declarative interface for manually adding and/or configuring the connection 214 between the asset 210 and the asset 212. Further, the flow builder interface 202 may be configured to program the asset 210 to generate a message, and pass the message to the asset 212 for further processing. As further illustrated in FIG. 2B, the asset 212 may be a logger component configured to log messages such as error messages, status notifications, or exceptions.

Figure 2C:
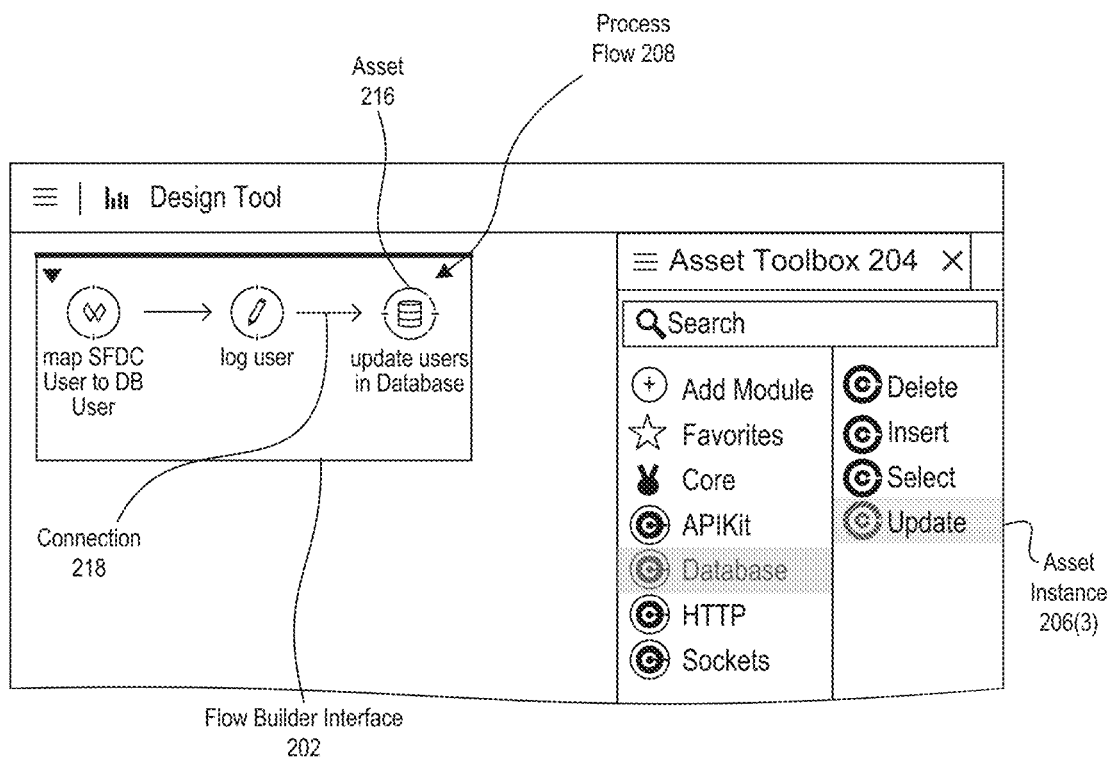

As illustrated in FIG. 2C, the developer may add an instance of the asset 206(3) from the asset toolbox 204 as the asset 216, and provide a title for the asset 216 within the process flow 208. In some instances, the developer may drag and drop the instance of the asset 206(3) from the asset toolbox 204 to the flow builder interface 202. In some other instances, the developer may use a configuration wizard or menu to add the instance of the asset 206(3) to the process flow 208 being constructed within the flow builder interface 202.

Upon receipt of the asset 216, the flow builder interface 202 may be configured to create a connection 218 between the asset 212 and the asset 216. Additionally, or alternatively, the integration-application design tool may provide an declarative interface for manually adding and/or configuring the connection 218 between the asset 212 and the asset 216. Further, the flow builder interface 202 may be configured to program the asset 212 to generate a message, and pass the message to the asset 216 via the connection 218 for further processing. As further illustrated in FIG. 2C, the asset 216 may be a connector component configured to connect to an external database and query the external database for database information.

As described in detail herein, the flow builder interface 202 may also automatically configure the resulting integration application to monitor analytics pertaining to the flow of messages in or out of an asset (e.g., the assets 210, 212, 216), or the operations performed by an asset in response to receipt of a message. For instance, upon adding the asset 212 to the flow builder interface 202, the integration-application design tool may be configured to program the asset 212 to collect analytics that permit the integration application and/or a monitor application to determine the amount of messages received by the asset 212 from the asset 210 over a predetermined period of time, the amount of messages sent by the asset 212 to the asset 216 over a predetermined period of time, processing rates of individual requests received by the asset 212, processing rates of particular types of messages received by the asset 212, response times to individual messages received by the asset 212, response times to particular types of requests received by the asset 212, a minimum processing time of messages received by the asset 212, a maximum processing time of messages received by the asset 212, a median processing time of messages received by the asset 212, and success and/or failure rates of messages received by the asset 212.

Further, the integration-application design tool may be configured to program the asset 212 to collect analytics that permit the integration application and/or a monitor application to determine an amount of executions of one or more operations of the asset 212, an average amount of execution time of one or more operations of the asset 212, a success or failure rate of one or more operations of the asset 212, an amount of executions of particular execution paths of the asset 212, an average amount of execution time of one or more execution paths of the asset 212, or a success or failure rate of one or more execution paths of the asset 212. In addition, the integration-application design tool may be configured to program the asset 212 to collect analytics that permit the integration application and/or a monitor application to determine frequently occurring input values or output values of messages of the asset 212, the range of input values or output values occurring within messages of the asset 212, frequently occurring unhandled error cases, frequently occurring handled error cases, and/or how often conditional statements or flow of control statements evaluate to true or false within the logic of the asset 212.

By providing data collection functionality within reusable declaratively-configurable assets, embodiments of the present disclosure provide a novel, intuitive, efficient, and secure system for monitoring data flow between disparate components of an integration application. Additionally, the collected analytics may be leveraged to improve the scalability, reliability and/or efficiency of an integration application by identifying performance bottlenecks, unhandled errors, scaling and breaking points, unused code, and/or system dependencies.

Figure 2D:
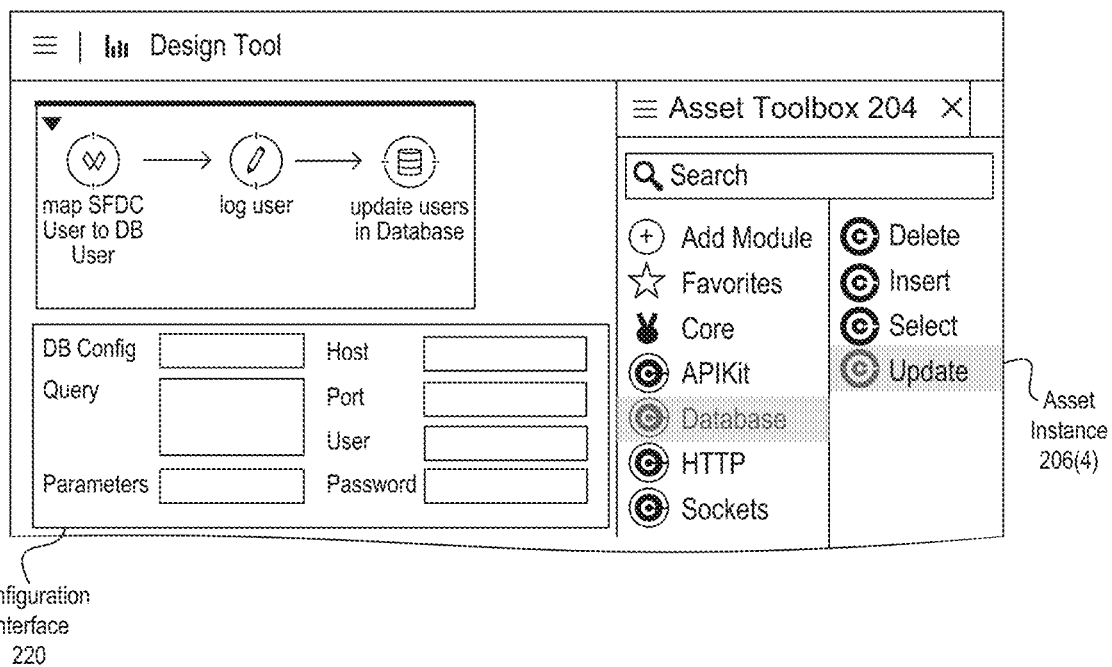

As illustrated in FIG. 2D, the GUI 200 may include a configuration interface 220 for configuring the process flow 208. In some embodiments, the configuration interface 220 may be configured to accept declarative input from the developer with respect to the assets (e.g., the asset 210, the asset 212, and the asset 216), and/or the connections 214, 218 between the assets. For example, the configuration interface 220 may receive declarative input from a developer that configures the asset 216 to update a customer's name within a second system based upon a message received from the asset 212.

In some instances, the configuration interface 220 may present different configuration fields based upon the type of asset. For example, the configuration interface 220 may include input fields for a display name, query text, input parameters, and/or connector configuration information for a structured query language (SQL) connector asset.

In some embodiments, the integration-application design tool may generate a configuration file at least partially in response to declarative input to the flow builder interface 202 and other interfaces (e.g., the configuration interface 220) of the integration-application design tool. Additionally, or alternatively, the developer may design the integration application within the integration-application design tool by hand. Further, the integration-application design tool may generate the configuration file in one or more computer languages. Some examples computer languages include eXtensible Markup Language (XML), YAML Ain't Markup Language (YAML), RESTful API Modeling Language (RAML), DataWeave, JavaScript Object Notation (JSON), Bash, Python, Lua, Beanshell, JavaScript, Perl, Ruby, and Tcl, JavaScript, Hyper Text Markup Language (HTML), HTML5, BASIC, C, Lisp, Lua, Python, Ruby, Java, Groovy, C, C++, C#, Visual Basic, Objective-C, Rust, Scala, etc.

Once the developer has completed development of the integration application, the integration-application design tool may package the integration application into a deployable file. The deployable file may include application code, configuration, and dependencies. In some embodiments, the integration-application design tool may package the integration application into a self-contained Java ARchive (JAR) file. Further, the deployable file may be deployed to a runtime environment to execute the integration application. In some embodiments, the deployable file may be deployed into a cloud environment or an on premises server.

Figure 3:
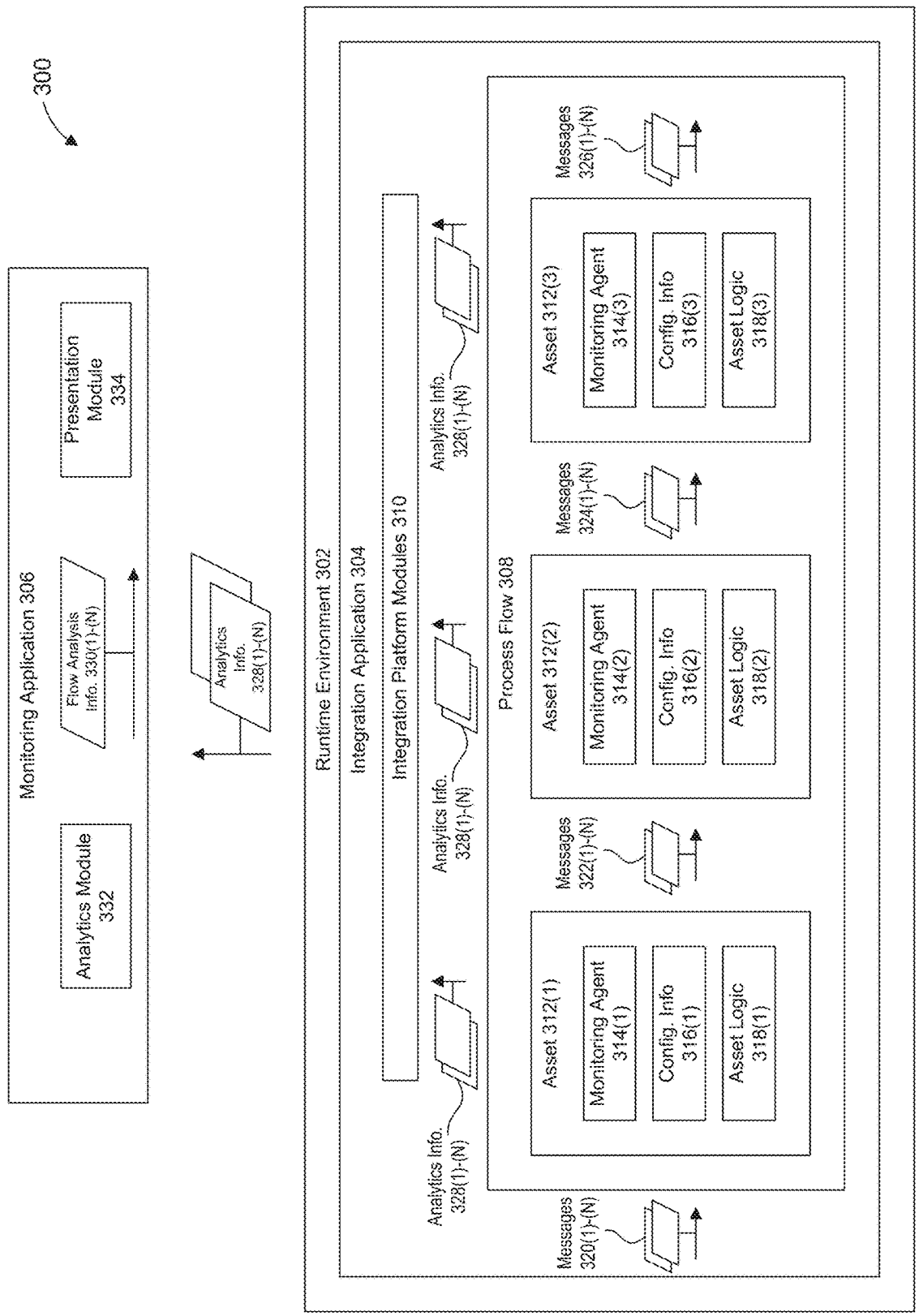
FIG. 3 is a block diagram of an example framework for implementing flow analysis in an integration platform system.

FIG. 3 is a block diagram of an example framework for implementing flow analysis in an integration platform system 300, according to some embodiments. As illustrated in FIG. 3, the integration platform system 300 includes a runtime environment 302 executing an integration application 304, and a monitoring application 306. The integration application 304 may include a process flow 308 and integration platform modules 310(1)-(N).

As illustrated in FIG. 3, the process flow 308 may include a first asset 312(1), a second asset 312(2), and a third asset 312(3). Although assets 312 (1)-(3) are shown in FIG. 3, the embodiments described herein are applicable to any number of assets 312. Further, each of the assets 312 may include an monitoring agent 314, asset configuration information 316, and/or asset logic 318. For example, the first asset 312(1) may include a first monitoring agent 314(1), first asset configuration information 316(1), and first asset logic 318(1).

As described in detail herein, the process flow 308 may receive a first message events 320(1)-(N) and provide the first message event 320(1)-(N) to the first asset 312(1) as requests. In response, the first asset 312(1) may process the first message events 320(1)-(N) via the asset logic 318(1) to generate second message events 322(1)-(N). For example, the first asset 312(1) may receive a first message event 320(1) with a payload including a first identifier associated with a user within a first system and a updated name for a customer. Further, the first asset 312(1) may determine a second identifier associated with the user based on the first identifier via the asset logic 318(1). In addition, the first asset 312(1) may generate a second message event 322(1) with a payload including the second identifier and the updated name for a customer, and send the second message event 322(1) to the second asset 312(2).

Further, the first asset 312(1) may forward the second message events 322(1)-(N) to the second asset 312(2). Upon receipt of the second message events 322(1)-(N), the second asset 312(2) may process the second message events 322(1)-(N) via the asset logic 318(2) to generate third message events 324(1)-(N). In addition, the second asset 312(2) may forward the third message events 324(1)-(N) to the third asset 312(3). For example, the asset 312(2) may receive the second message event 322(1) and log the payload information of the second message event 322(1) via the asset logic 318(2). In some embodiments, the second asset 312(2) may log the payload information to a log file identified by the configuration information 316(2). In addition, the second asset 312(2) may generate a third message event 324(1) with a payload including the second identifier and the updated name for a customer, and send the third message event 324(1) to the third asset 312(2).

Upon receipt of the third message events 324(1)-(N), the third asset 312(3) may process the third message events 324(1)-(N) via the asset logic 318(3) to generate fourth message events 326(1)-(N). For example, the asset 312(3) may receive the third message event 324(1) and update customer name via the asset logic 318(3). For example, the asset logic 318(3) may cause the third asset 312(3) to send an update command to an external database identified by the configuration information 316(3). In addition, the second asset 312(2) may generate a fourth event message 326(1) with a payload including an acknowledgement response, and send the message 326(1) to a module associated with the request to update the customer's name within the integration application 304.

Additionally, the monitoring agents 314(1)-(3) may continuously collect analytics information 328(1)-(N) corresponding to the operation of assets 312(1)-(3), and send the analytics information 328(1)-N) to the integration platform modules 310. For example, the monitoring agent 314(2) may determine the analytics information 328(2) by monitoring receipt of the second message event 322 by the asset 312(2), performance of one or more operations of the asset logic 318(2) by the asset 312(2), and generation of the third message event 324 by the asset 312(2). Further, the monitoring agent 314(2) may send the analytics information 328(2) to the to the integration platform modules 310, which may collect the analytics information 328(1)-(N) from the different monitoring agents 314(1)-(3) and send collect the analytics information 328(1)-(N) to the monitoring application 306. In addition, the monitoring agent 314(2) may determine the analytics information 328(2) to collect based on the asset configuration information 316(2). For instance, the asset configuration information 316(2) may include settings instructing the monitoring agent 314(2) to maintain a count of the amount of messages (e.g. the message events 322) received by the second asset 312(2).

The asset logic 318 and/or asset configuration information 316 may further include settings instructing a monitoring agent 304 to maintain information that permits the integration application 304 and/or the monitor application 306 to determine the amount of messages received by the asset 312 from another asset over a predetermined period of time, the amount of messages sent by the asset 312 to another asset over a predetermined period of time, processing rates of individual requests received by the asset 312, processing rates of particular types of messages received by the asset 312, response times to individual messages received by the asset 312, response times to particular types of requests received by the asset 312, a minimum processing time of messages received by the asset 312, a maximum processing time of messages received by the asset 312, a median processing time of messages received by the asset 312, success and/or failure rates of messages received by the asset 312, determine an amount of executions of one or more operations of the asset 312, an average amount of execution time of one or more operations of the asset 312, a success or failure rate of one or more operations of the asset 312, an amount of executions of particular execution paths of the asset 312, an average amount of execution time of one or more execution paths of the asset 312, a success or failure rate of one or more execution paths of the asset 312, common input values or output values of messages of the asset 312, a range of input values or output values occurring within incoming or outgoing messages of the asset 312, commonly occurring unhandled error cases, commonly occurring handled error cases, and/or how often conditional statements or flow of control statements evaluate to true or false within the logic of the asset 312.

In some embodiments, the asset configuration information 316 may be at least partially set during development of the process flow 308. For instance, a developer may set the asset configuration information 316(2) via an integration-application design tool during development. Additionally, or alternatively, the integration application 304 and/or the monitoring application 306 may dynamically update the asset configuration information 316 during execution of the integration application. As a result, a developer may dynamically determine the type of analytics information 328(2) the monitoring agent 314(2) may collect.

In some embodiments, the asset logic 318 may be at least partially determined by an integration-application design tool during development. For example, the asset logic 318(1)-(3) may be generated based at least in part on input to a flow builder interface (e.g., the flow builder interface 202) of an integration-application design tool during development.

Upon receipt of the analytics information 328(1)-(N), at least one of the integration platform modules 310(1)-(N) may send the analytics information 328(1)-(N) to the monitoring application 306. The integration platform modules 310(1)-(N) may provide integration libraries and services (e.g., routing services, a message broker, transaction management, transportation management, security, transformation, etc.) to integration applications (e.g., the integration platform 304) built on the integration platform.

Further, the monitoring application 306 may be configured to determine the flow analysis information 330 based on the analytics information 328 via an analytics module 332, and present the flow analysis information 330 to a user via a presentation module 334. In some embodiments, the presentation module 334 may be configured to generate and display a GUI (e.g., the GUI 100) displaying graphical representation of the process flow process flow 308 and the corresponding flow analysis information 330.

In some embodiments, the integration application 304 and the monitoring application 306 may execute on the same computing system. Additionally, or alternatively, in some instances, the monitoring application 306 and an integration-application design tool may execute on the same system or within the same application. As such, the flow analysis information 316 may be presented with a declarative software development interface (e.g., GUI 200, flow builder interface 202, etc.). For example, a process flow depicted within the flow builder interface 202 may be displayed with recently determined flow analysis information 330 in order to provide a data driven development environment.

In some other embodiments, the runtime environment 302 and the monitoring application 306 may execute on separate systems. For example, the integration application 304 may send the analytics information 328 to the monitoring application 306 via a communications network. Further, the communications network may include any or all of a private network, personal area network (PAN), Local-Area Network (LAN), a Wide-Area Network (WAN), or the Internet.

Figure 4:
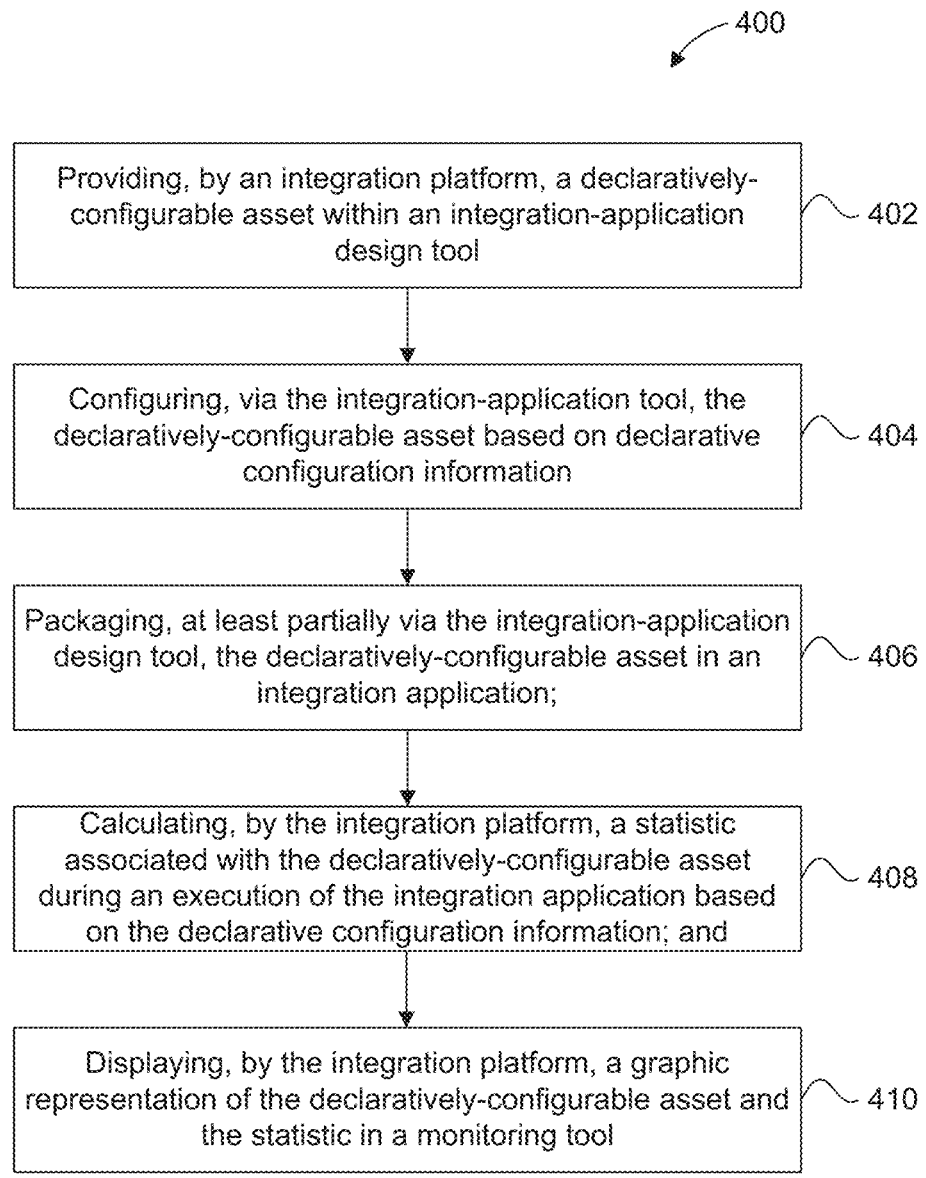
FIG. 4 illustrates a method for implementing flow analysis in an integration platform, according to some embodiments, according to some embodiments.

FIG. 4 illustrates a method 400 for implementing flow analysis in an integration platform, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, an integration platform may provide, by an integration platform, a declaratively-configurable asset within an integration-application design tool. For example, an integration-application design tool may provide the asset toolbox 204 including one or more assets 206(1)-(N) that may be incorporated into a integration application. As described herein, the assets 206(1)-(N) may be configured using declarative input from a developer. In addition, each asset 206 may include monitoring functionality for collecting analytics pertaining to operations performed by the asset 206.

In 404, the integration platform may configure the declaratively-configurable asset based on declarative configuration information. For example, the integration-application design tool may be employed to add an asset 206 into the process flow 208 of an integration application. As a result, the asset 206 may be configured to receive, process, and send messages as an event processor within the process flow 208. In some instances, a developer may drag and drop a graphical representation of the asset (i.e., asset instance 206(3)) from the asset toolbox 204 to the flow builder interface 202 to construct the process flow 208 to include the asset 216.

Additionally, the developer may employ the configuration interface 220 to provide declarative configuration information for the asset 216. For example, the developer may provide declarative statements (e.g., SQL commands) and/or other configuration information via the configuration interface 220 to program the functionality of the asset 216 within the process flow 208. Further, the integration-application design tool may generate application code (e.g., a XML configuration file defining configurable attributes of the assets) based upon the process flow 208 and the input to the configuration interface 220.

In some embodiments, the integration-application design tool may configure the assets 210, 212, 216 to collect analytics information corresponding to the declarative configuration information. For example, the integration-application design tool may determine a sequence of the process flow 208 based upon the ordering of the assets 210, 212, 216 within the process flow 208. Further, the integration-application design tool may configure the assets 210, 212, 216 to collect analytics information on messages received from each other and messages sent to each other. In another example, a developer may provide one or more SQL commands via the configuration interface 220. In addition, the integration-application design tool may configure the assets 210, 212, 216 to collect analytics information on the success or failure rate of the SQL commands, the frequency of execution of the SQL commands, the processing time of the commands, input parameters to the SQL commands, and the results of the SQL commands.

In yet still another example, the integration-application design tool may configure the assets to collect analytics information based at least in part on a type of the asset or the other asset-specific attributes of an asset. For instance, if an asset includes control flow statements (e.g., do while loops, while loops, for comprehensions, for loops, etc.), conditional statements, multiple execution paths, or developer provided scripts, the asset may be configured to collect analytics information on the portions of code associated with the control flow statements, conditional statements, multiple execution paths, and/or developer provided scripts. For instance, the asset may be configured to track occurrences of the evaluation results (e.g., true or false) of conditional statements, iterations through a control flow construct, or executions of at least a portion of a developer provided script. In some other instances, the asset may be configured to track processing rates or failure/success rates of portions of code associated with the control flow statements, conditional statements, multiple execution paths, and/or developer provided scripts.

In some examples, the pre-defined logic of the assets 210, 212, 216 may include the monitoring functionality. Further, the pre-defined logic may be shared across one or more of the assets the assets 210, 212, 216. For instance, the pre-existing logic of the assets 210, 212, 216 may implement an interface or API common to the assets of the asset toolbox 204.

In 406, the integration platform may package the declaratively-configurable asset in an integration application. For example, the integration-application design tool may package the assets 312(1)-(3) into the integration application during a build process. In some examples, the build process may generate a deployable executable (e.g., a JAR file) corresponding to the integration application. Further, the deployable executable may be configured to perform the process flow 308 based on the configuration information 316(1)-(3) and asset logic 318(1)-(3) when executed within the runtime environment 302.

In 408, the integration platform may calculate a statistic associated with the declaratively-configurable asset during an execution of the integration application based on the declarative configuration information. For instance, the assets 312(1)-(3) may be configured to collect the analytics information 328(1)-(N) based on declarative configuration information provided by the developer during development. Further, the integration application may provide the analytics information 328(1)-(N) to a monitoring tool (e.g., the monitoring application 306). In addition, the monitoring tool may determine the flow analysis information 330 based on the analytics information 328 via the analytics module 332.

As an example, the monitoring agent 314 of the asset 312(2) may track the success and failure of SQL commands (i.e., analytics information 328) provided as configuration information via a configuration interface 220 (e.g., the configuration interface 220). Further, the monitoring application 306 may determine the rate of success of the SQL commands based at least in a part on the tracked information.

Additionally, or alternatively, the integration application 304 may determine the flow analysis information 330 based on the analytics information 328. For example, at least one of the integration platform modules 310(1)-(N) may be configured determine the flow analysis information 330 based on the analytics information 328(1)-(N).

In 410, displaying, by the integration platform, a graphic representation of the declaratively-configurable asset and the statistic in a monitoring tool, wherein at least one of the providing, configuring, packaging, calculating, and displaying are performed by one or more computers. For example, the presentation module 334 may receive the flow analysis information from analytics module 332 or the integration application 304, and present the flow analysis information 330 to a user via the GUI 100. In some embodiments, the presentation module 334 may present flow representations (e.g., the flow representation 102), asset representations (e.g., the asset representations 106(1)-(4)), flow analysis information (e.g., the flow analysis information 108(1)-(4)), detailed flow analysis information (e.g., the detailed flow analysis information 110) and verbose flow analysis information (e.g., the verbose flow analysis information 114) via a GUI (e.g., the GUI 100).

In some embodiments, the flow analysis information (e.g., the flow analysis information 108(1)-(4)), detailed flow analysis information (e.g., the detailed flow analysis information 110) and verbose flow analysis information (e.g., the verbose flow analysis information 114) may be presented within a integration-application design tool. As such, a developer may perform data-driven to modifications an existing code base to meet performance, usability, and reliability goals of an integration application.

Figure 5:
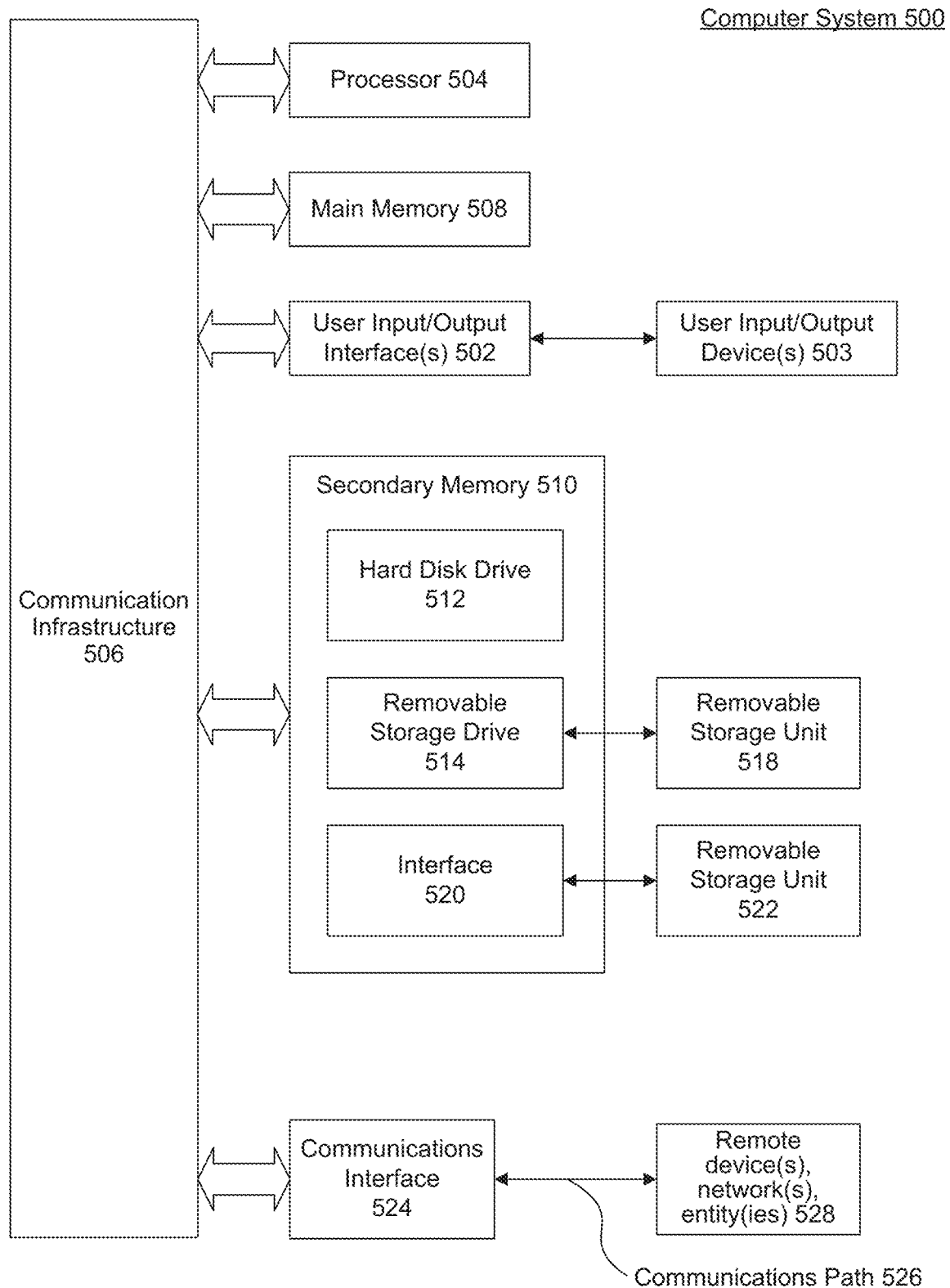
FIG. 5 illustrates a computer system, according to exemplary embodiments of the present disclosure.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
providing, by an integration platform, a declaratively-configurable asset within an integration-application design tool, wherein the declaratively-configurable asset forms part of a process flow comprising a plurality of assets that determine functionality of an integration application;
configuring, via the integration-application design tool, the declaratively-configurable asset based on declarative configuration information, wherein the declaratively-configurable asset is configured to collect analytics by a monitoring agent of the declaratively-configurable asset as specified by the declarative configuration information;
packaging, at least partially via the integration-application design tool, the declaratively-configurable asset into the integration application;
calculating, by the integration platform, a statistic associated with the declaratively-configurable asset based on the analytics collected by the monitoring agent of the declaratively-configurable asset during an execution of the integration application; and
displaying, by the integration platform, a graphic representation of the declaratively-configurable asset and the statistic in a monitoring tool, wherein the statistic is provided by the integration application from the monitoring agent of the declaratively-configurable asset to the monitoring tool,
wherein at least one of the providing, configuring, packaging, calculating, and displaying are performed by one or more processors.

2. The method of claim 1, further comprising:
determining, by the integration platform, a query run within an operation in the declaratively-configurable asset based on the declarative configuration information;
calculating, by the integration platform, a query-specific statistic about the query; and
displaying, by the integration platform, the graphic representation of the declaratively-configurable asset and the query-specific statistic.

3. The method of claim 1, further comprising:
determining, by the integration platform, an operation run within the declaratively-configurable asset;
calculating, by the integration platform, an average response time for the operation; and displaying, by the integration platform, the graphic representation of the declaratively-configurable asset and the average response time for the operation.

4. The method of claim 1, further comprising:
determining, by the integration platform, a looping statement run within the declaratively-configurable asset;
calculating, by the integration platform, a number of iterations of the looping statement; and
displaying, by the integration platform, the graphic representation of the declaratively-configurable asset and the number of iterations of the looping statement.

5. The method of claim 1, further comprising:
determining, by the integration platform, a portion of code contained in the declaratively-configurable asset;
calculating, by the integration platform, a number of executions for the portion of code; and
displaying, by the integration platform, the graphic representation of the declaratively-configurable asset and the number of executions for the portion of code.

6. The method of claim 1, further comprising:
determining, by the integration platform, a conditional statement contained in the declaratively-configurable asset;
calculating, by the integration platform, a number of occurrences of an evaluation result of the conditional statement; and
displaying, by the integration platform, the graphic representation of the declaratively-configurable asset, the number of occurrences, and the evaluation result.

7. The method of claim 1, further comprising:
determining, by the integration platform, an input to the asset or an output from the declaratively-configurable asset; and
displaying, by the integration platform, the graphic representation of the declaratively-configurable asset and the input or the output.

8. A system, comprising:
a memory; and
at least one processor coupled to the memory and configured to:
provide a declaratively-configurable asset in an integration-application design tool, wherein the declaratively-configurable asset forms part of a process flow comprising a plurality of assets that determine functionality of an integration application;
configure, via the integration-application design tool, the declaratively-configurable asset based on declarative configuration information, wherein the declaratively-configurable asset is configured to collect analytics by a monitoring agent of the declaratively-configurable asset as specified by the declarative configuration information;
deploy the declaratively-configurable asset in the integration application built at least partially in the integration-application design tool;
calculate a statistic associated with the declaratively-configurable asset during an execution of the integration application based on the analytics collected by the monitoring agent of the declaratively-configurable asset; and
display a graphic representation of the declaratively-configurable asset and the statistic in a monitoring tool, wherein the statistic is provided by the integration application from the monitoring agent of the declaratively-configurable asset to the monitoring tool.

9. The system of claim 8, the at least one processor further configured to:
   determine a query run within an operation in the declaratively-configurable asset;
   calculate a query-specific statistic about the query based on the declarative configuration information; and
   display the graphic representation of the declaratively-configurable asset and the query-specific statistic.

10. The system of claim 8, the at least one processor further configured to:
    determine an operation run within the declaratively-configurable asset;
    calculate an average response time for the operation; and
    display the graphic representation of the declaratively-configurable asset and the average response time.

11. The system of claim 8, the at least one processor further configured to:
    determine a looping statement run within the declaratively-configurable asset;
    calculate a number of iterations of the looping statement; and
    display the graphic representation of the declaratively-configurable asset and the number of iterations of the looping statement.

12. The system of claim 8, wherein the;
    determine a portion of code contained in the asset;
    calculate a number of executions for the portion of code; and
    display the graphic representation of the declaratively-configurable asset and the number of executions for the portion of code.

13. The system of claim 8, wherein the;
    determine a conditional statement contained in the declaratively-configurable asset;
    calculate a number of occurrences of an evaluation result of the conditional statement; and
    display the graphic representation of the declaratively-configurable asset, the number of occurrences, and the evaluation result.

14. The system of claim 8, wherein the;
    determine an input to the declaratively-configurable asset or an output from the declaratively-configurable asset; and
    display the graphic representation of the declaratively-configurable asset and the input or the output.

15. A non-transitory computer-readable device having instructions stored thereon that, when executed by at least one computing device, causes the at least one computing device to perform operations comprising:
    providing a declaratively-configurable asset within an integration-application design tool, wherein the declaratively-configurable asset forms part of a process flow comprising a plurality of assets that determine functionality of an integration application;
    configuring the declaratively-configurable asset based on declarative configuration information via the integration-application design tool, wherein the declaratively-configurable asset is configured to collect analytics by a monitoring agent of the declaratively-configurable asset as specified by the declarative configuration information;
    packaging the declaratively-configurable asset into the integration application;
    calculating a statistic associated with the declaratively-configurable asset based on the analytics collected by the monitoring agent of the declaratively-configurable asset during an execution of the integration application; and
    causing display of a graphic representation of the declaratively-configurable asset and the statistic in a monitoring tool, wherein the statistic is provided by the integration application from the monitoring agent of the declaratively-configurable asset to the monitoring tool.

16. The non-transitory computer-readable device of 15, the operations further comprising:
    determining a query run within an operation in the declaratively-configurable asset;
    calculating a query-specific statistic about the query based on the declarative configuration information; and
    causing display of the graphic representation of the declaratively-configurable asset and the query-specific statistic.

17. The non-transitory computer-readable device of claim 15, the operations further comprising:
    determining an operation run within the declaratively-configurable asset;
    calculating an average response time for the operation; and
    causing display of the graphic representation of the declaratively-configurable asset and the average response time for the operation.

18. The non-transitory computer-readable device of claim 15, the operations further comprising:
    determining a looping statement run within the declaratively-configurable asset;
    calculating a number of iterations of the looping statement; and
    causing display of the graphic representation of the declaratively-configurable asset and the number of iterations of the looping statement.

19. The non-transitory computer-readable device of claim 15, wherein the;
    determining a portion of code contained in the declaratively-configurable asset;
    calculating a number of executions for the portion of code; and
    causing display of the graphic representation of the declaratively-configurable asset and the number of executions for the portion of code.

20. The non-transitory computer-readable device of claim 15, wherein the;
    determining a conditional statement contained in the declaratively-configurable asset;
    calculating a number of occurrences of an evaluation result of the conditional statement; and
    causing display of the graphic representation of the declaratively-configurable asset, the number of occurrences, and the evaluation result of the conditional statement.

* * * * *